Jan. 30, 1962  F. B. ROBB ET AL  3,018,815
VALVE STEM RETAINER
Filed Oct. 28, 1958

INVENTORS
S. J. KOSIK JR.
and
BY F. B. ROBB
Robb & Robb
Attorneys

United States Patent Office 3,018,815
Patented Jan. 30, 1962

3,018,815
VALVE STEM RETAINER
Frank B. Robb, 1351 Mayfield Road, and Samuel J. Kosik, Jr., 6146 Landerhaven Drive, both of Mayfield Heights, Ohio
Filed Oct. 28, 1958, Ser. No. 770,160
4 Claims. (Cl. 152—427)

This invention relates to valve stem retaining means for use in preventing valve stems of pneumatic tires from damaging the tire casing when the tire is operated after deflation of the tube by a puncture or the like.

The invention is primarily useful to prevent damage to truck tires which, when provided in dual wheel arrangement may often become deflated without the knowledge of the vehicle operator and operated thereafter for some period of time.

The damage referred to occurs when the stem is drawn into the interior of the tire whether by some movement of the tube or by centrifugal force and because it is a rather heavy metal unit, rips and tears the inner wall of the tire as well as the tube during roation of the wheel.

The cost of truck tires is such that means to prevent such destruction are valuable, particularly if such means are relatively inexpensive, easy to install, permanent or removable at will and do not adversely affect the balance of the tire, rim and wheel assembly.

The construction of heavy truck wheel rims is such as to virtually preclude the use of threaded valve stems which could be provided with suitable nuts to engage the rim, and thus position the stem relative thereto to prevent the occurrence previously outlined from taking place, and thus a different approach to retention of the stem is necessary.

The instant invention contemplates such different approach and has for its principal object the provisions of a valve stem retaining device which is simple in construction, low in cost, easy to install and removable when necessary, only the simplest tools being necessary for the purpose.

Another object of the invention is to provide a valve stem retaining device comprising a single member or unit which is easily placed on the valve stem and when positioned is arranged to have a portion engage the rim or be positioned adjacent thereto ready to engage such rim and prevent the stem from entering the interior of the tire under any conditions.

A further object of the invention is to provide a stem retainer which includes gripping means which are easily adjustable to grip and release such grip on the stem, a single adjusting unit being provided therefor.

A further object of the invention is to provide a novel article of manufacture which embodies a single metal stamping which includes the necessary portion to grip the stem and be releasably engaged therewith as well as suitable arms or the like to prevent the stem from being drawn or otherwise entering the interior of the tire to thereby damage the same.

Other and further objects of the invention will be understood from a consideration of the specification appended hereto and disclosed in the drawing wherein.

Figure 1:
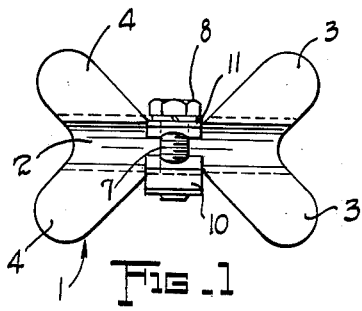
FIGURE 1 is a top plan view of the device of this invention.

Turning now to a consideration of the drawing, the device of this invention is shown in FIGURE 1 and generally denoted 1, including a body portion 2 thereof which is provided with the arms 3 at the right hand portion of the body and the arms 4 at the left hand portion of the body as viewed in such figure.

Figure 2:
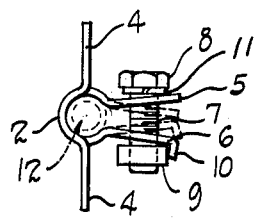
FIGURE 2 is an end view of the device of this invention.

Referring to FIGURE 2, the body 2 is shown as being equipped with the upstanding arms 5 and 6, which are integral with the body and diverging arms 3 and 4, the arm 5 being provided with an opening therein through which a bolt such as 7 may extend, the bolt 7 being provided with a head 8 and a nut 9 at the opposite end thereof.

The arm 6 is provided with a flange 10 at the upper end thereof which extends at right angles to the arm 6 and is intended to prevent rotation of the nut when assembled on the bolt 7 and manipulated by the head 8.

A suitable lock washer such as 11 may preferably be provided under the bolt head 8 so as to engage the outer face of the upstanding arm 5 and cause the arm upon manipulation of the bolt by a suitable wrench to assume the dotted line positions shown in said figure, and engage a valve stem such as is indicated at 12 in dotted lines in FIGURE 2.

Figure 3:
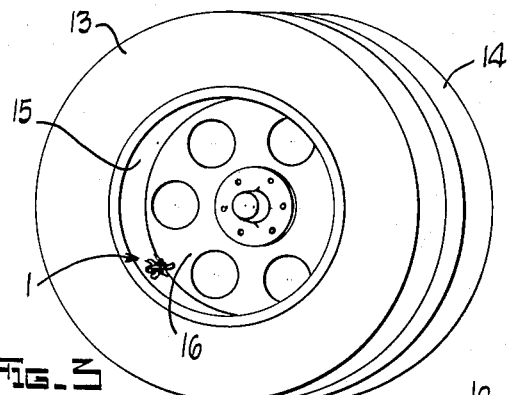
FIGURE 3 is a perspective view indicating the position of one of the devices used with dual wheels.
Figure 4:
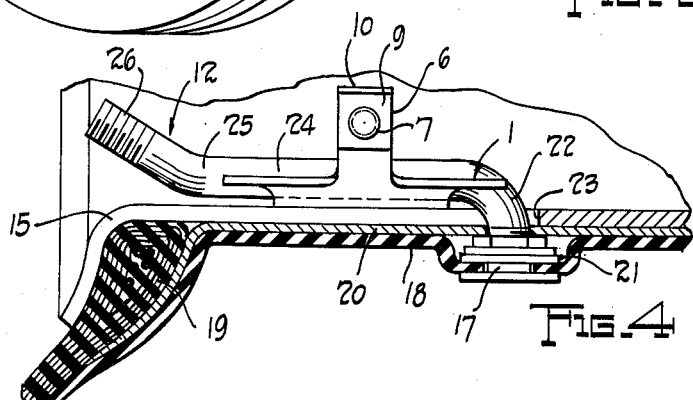
FIGURE 4 is an enlarged fragmentary sectional view partly in section showing a device installed on a valve stem of a truck wheel, tire, wheel and rim assembly.

The general assembly just previously described is intended to be seated on the valve stem such as 12 in the manner indicated in detail in FIGURE 4 and generally indicated in FIGURE 3 at 1 as previously indicated, the tire and wheel assembly of FIGURE 3 including dual tires 13 and 14 mounted on suitable rims, the rim for the tire 13 being indicated at 15 and the wheel for such rim being denoted 16. This view of course is primarily illustrative and FIGURE 4 will be referred to hereinafter for the details of location and mounting of the device hereof, on the stem 12 of such figure.

As indicated in the FIGURE 4 disclosure, the rim 15 is provided with a slot therein in accordance with conventional rim construction for heavy truck wheel and tire assemblies, through which the valve stem 12 may be inserted, the valve stem being in turn connected at 17 to the inner tube 18 usually provided. The tire is indicated at 19 and a flap such as 20 is generally provided within the tire and seated on the rim such as 15. The valve stem 12 is of course suitably engaged with the inner tube 18 at 17 as mentioned previously as by means of a suitable pad 21 which provides for the stem, the stem being bent at 22 and extending thereafter along the slot which for the purposes hereof will be denoted 23, the longitudinal part of the stem being denoted 24.

The stem 12 of course is bent upwardly as indicated at about 25 and at its end equipped with the usual threaded portion 26 to receive a valve cap, the interior of the stem of course being equipped with the usual valve core so that the tube may be inflated as is conventionally the case.

Figure 5:
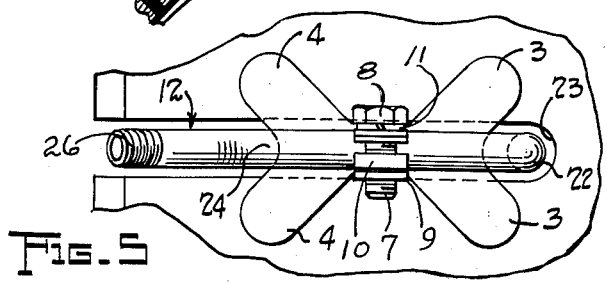
FIGURE 5 is a top view of the FIGURE 4 disclosure and likewise fragmentary in nature.

The valve stem retainer hereof is shown as being mounted on the stem, having been positioned as indicated in FIGURE 4 by sliding the device over the stem through the opening provided by the body 2 and the upstanding arms 5 and 6 as well as the bolt 7 to assume the position of FIGURE 4 and FIGURE 5 with the diverging arms 3 positioned so as to virtually surround the valve stem at the section 22 thereof and provide a bearing upon the surface of the rim at opposite sides of the slot 23 therein.

The offstanding arms 4 are provided to additionally furnish bearing at the opposite end of the device or in the event the device is inserted on the stem, with the arms 4 in the position of the arms 3.

After the device is positioned as indicated in FIGURES 4 and 5, of course the bolt 7 may be manipulated by a wrench or the like to draw the same up and cause the extending arms 5 and 6 to assume the dotted line position indicated in FIGURE 2 whereby the stem is gripped and the device as a whole is positioned on the stem.

Thereafter the stem cannot possibly be caused to move into the interior of the tire through the slot because of the provision of the arms 3 and 4 and the gripping of the stem 12 by the manipulation previously mentioned.

The cross-sectional configuration of the device assembled on the stem as shown particularly in FIGURE 2 including the arms 4 for example, is such as to preclude the stem from moving into the interior of the tire, even if the stem assumes a position at right angles to that shown in FIGURES 4 and 5.

This is true because the gripping arms 5 and 6 will also engage opposite sides of the slot.

As will be clearly understood the retainer hereof may be removed by loosening the bolt 7 so that the arms 5 and 6 in accordance with their natural resilience will permit the device as a whole to be slid off of the stem again in the event of necessity to repair the tube or remove the same from the position shown.

Figure 6:
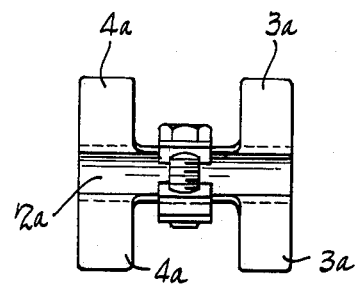
FIGURE 6 is a plan view showing a modified form of retainer.

The modification shown in FIGURE 6 relates to the arms 3a and 4a, the same being at about right angles to the body 2a, all other parts corresponding to similar parts of the previously described form.

The FIGURE 6 form is susceptible of some manufacturing economies and yet functions in the same manner as the device first described herein.

We claim:

1. In a valve stem retainer of the class described, in combination, a valve stem, a body adapted to be positioned beneath said stem, arms integral with the body and extending outwardly therefrom some distance from the stem, and clamping instrumentalities integral with the body and extending therefrom so as to surround the stem and retain the stem in position with respect to a rim or the like, said instrumentalities including parts to actuate the same for clamping action.

2. A retainer as claimed in claim 1, wherein the clamping instrumentalities are adjustable.

3. A retainer as claimed in claim 1, wherein the body is shaped to conform to the valve stem, the arms are angularly positioned with respect to the body to extend at least partially around the stem, and the clamping instrumentalities are adjustable.

4. A retainer as claimed in claim 1, wherein the clamping instrumentalities comprise a pair of upstanding arms, and the arms are provided with parts to cause the arms to effect clamping action on the valve stem.

References Cited in the file of this patent

UNITED STATES PATENTS

| | | |
|---|---|---|
| 746,956 | Grantham | Dec. 15, 1903 |

FOREIGN PATENTS

| | | |
|---|---|---|
| 29,231 | Australia | July 17, 1931 |

OTHER REFERENCES

Trademark application for Sav-a-Tir, Serial No. 34,179 filed July 22, 1957, in the name of Sav-a-Tir, 1296 Sylvan Rd. S.W., Office 9, Atlanta, Ga., Trademark registered No. 663,662, July 1, 1958.